(12) United States Patent
Hasegawa et al.

(10) Patent No.: US 10,399,381 B2
(45) Date of Patent: Sep. 3, 2019

(54) NON-PNEUMATIC TIRE

(71) Applicant: BRIDGESTONE CORPORATION, Tokyo (JP)

(72) Inventors: Keiichi Hasegawa, Tokyo (JP); Yoshihide Kouno, Tokyo (JP); Masashi Nishida, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 76 days.

(21) Appl. No.: 15/521,670

(22) PCT Filed: Oct. 1, 2015

(86) PCT No.: PCT/JP2015/077932
§ 371 (c)(1),
(2) Date: Apr. 25, 2017

(87) PCT Pub. No.: WO2016/072181
PCT Pub. Date: May 12, 2016

(65) Prior Publication Data
US 2017/0232787 A1   Aug. 17, 2017

(30) Foreign Application Priority Data

Nov. 7, 2014   (JP) .................................. 2014-226981

(51) Int. Cl.
*B60B 9/04*      (2006.01)
*B60C 7/00*      (2006.01)
(Continued)

(52) U.S. Cl.
CPC .................. *B60B 9/04* (2013.01); *B60C 7/00* (2013.01); *B60C 7/14* (2013.01); *B60C 7/26* (2013.01);
(Continued)

(58) Field of Classification Search
CPC . B60B 9/04; B60B 2900/321; B60B 2360/34; B60C 7/26; B60C 7/14; B60C 7/00; B60C 2007/005
(Continued)

(56) References Cited

U.S. PATENT DOCUMENTS 4,358,162 A * 11/1982 Schneider ............... B60B 37/10
301/122
2010/0193097 A1   8/2010 McNier et al.
(Continued)

FOREIGN PATENT DOCUMENTS

CN    101687432 A    3/2010
CN    203078232 U    7/2013
(Continued)

OTHER PUBLICATIONS

Communication dated Mar. 16, 2018 from the European Patent Office in counterpart application No. 15857417.8.
(Continued)

*Primary Examiner* — S. Joseph Morano
*Assistant Examiner* — Jean W Charleston
(74) *Attorney, Agent, or Firm* — Sughrue Mion, PLLC

(57) ABSTRACT

The present invention provides a non-pneumatic tire which is provided with an attachment body (11) attached to an axle, a ring-shaped body (13) which surrounds the attachment body (11) from the outside in a tire radial direction, and a coupling member (15) which displaceably couples the attachment body (11) and the ring-shaped body (13), wherein the coupling member (15) is formed of a synthetic resin material and a reinforcing member is embedded in the coupling member (15).

8 Claims, 12 Drawing Sheets

(51) Int. Cl.
  *B60C 7/14*  (2006.01)
  *B60C 7/26*  (2006.01)
(52) U.S. Cl.
  CPC ..... *B60B 2360/34* (2013.01); *B60B 2900/321* (2013.01); *B60C 2007/005* (2013.01)
(58) Field of Classification Search
  USPC .................. 152/246, 247, 251, 252, 261
  See application file for complete search history.

(56) References Cited

U.S. PATENT DOCUMENTS

| 2010/0200131 | A1* | 8/2010 | Iwase ................ B29D 30/00 152/209.1 |
| 2014/0062168 | A1 | 3/2014 | Martin et al. |
| 2014/0238561 | A1 | 8/2014 | Choi et al. |
| 2014/0251518 | A1* | 9/2014 | Abe ..................... B60B 9/04 152/75 |

FOREIGN PATENT DOCUMENTS

| EP | 2305489 A1 | 4/2011 |
| JP | 2004-360803 A | 12/2004 |
| JP | 2008-132951 A | 6/2008 |
| JP | 2011-219009 A | 11/2011 |
| JP | 2013-086712 A | 5/2013 |
| JP | 2014-118116 A | 6/2014 |
| JP | 2014125082 A | 7/2014 |
| JP | 2014151739 A * | 8/2014 |
| JP | 2014-169066 A | 9/2014 |
| WO | 03018332 A1 | 3/2003 |
| WO | 2008118983 A1 | 10/2008 |

OTHER PUBLICATIONS

International Search Report of PCT/JP2015/077932 dated Nov. 24, 2015.

Search Report dated Nov. 19, 2018 from the State Intellectual Property Office of the P.R.C. in application No. 2015800588482.

* cited by examiner

NON-PNEUMATIC TIRE

TECHNICAL FIELD

The present invention relates to a non-pneumatic tire in which filling of pressurized air is not necessary, when in use.

Priority is claimed on Japanese Patent Application No. 2014-226981, filed on Nov. 7, 2014, the content of which is incorporated herein by reference.

BACKGROUND ART

As an example of this type of non-pneumatic tire, a configuration including an attachment body attached to an axle, a ring-shaped body which surrounds the attachment body from the outside in the tire radial direction, and a coupling member which displaceably couples the attachment body to the ring-shaped body, in which at least the coupling member is formed of a synthetic resin material, is known as described in Patent Document 1 below, for example.

CITATION LIST

Patent Document

[Patent Document 1]
Japanese Unexamined Patent Application, First Publication No. 2013-86712

SUMMARY OF INVENTION

Technical Problem

However, in conventional non-pneumatic tires, there is room for improvement in improving durability of a coupling member and expanding a range of selection of synthetic resin materials forming the coupling member.

In consideration of the above-described circumstances, the present invention is directed to providing a non-pneumatic tire in which durability of the coupling member can be improved and a range of selection for synthetic resin materials forming the coupling member may be expanded.

Solution to Problem

To achieve the above-described objects, the present invention provides the following means.

A non-pneumatic tire according to the present invention includes an attachment body attached to an axle, a ring-shaped body which surrounds the attachment body from the outside in the radial direction of the tire, and a coupling member which displaceably couples the attachment body and the ring-shaped body, in which the coupling member is formed of a synthetic resin material and includes a reinforcing member embedded therein.

Effects of Invention

In a non-pneumatic tire according to the present invention durability of a coupling member can be improved and a range of selection for synthetic resin materials forming the coupling member can be expanded.

DESCRIPTION OF EMBODIMENTS

Hereinafter, an embodiment of a non-pneumatic tire according to the present invention will be described with reference to the drawings.

Figure 1:
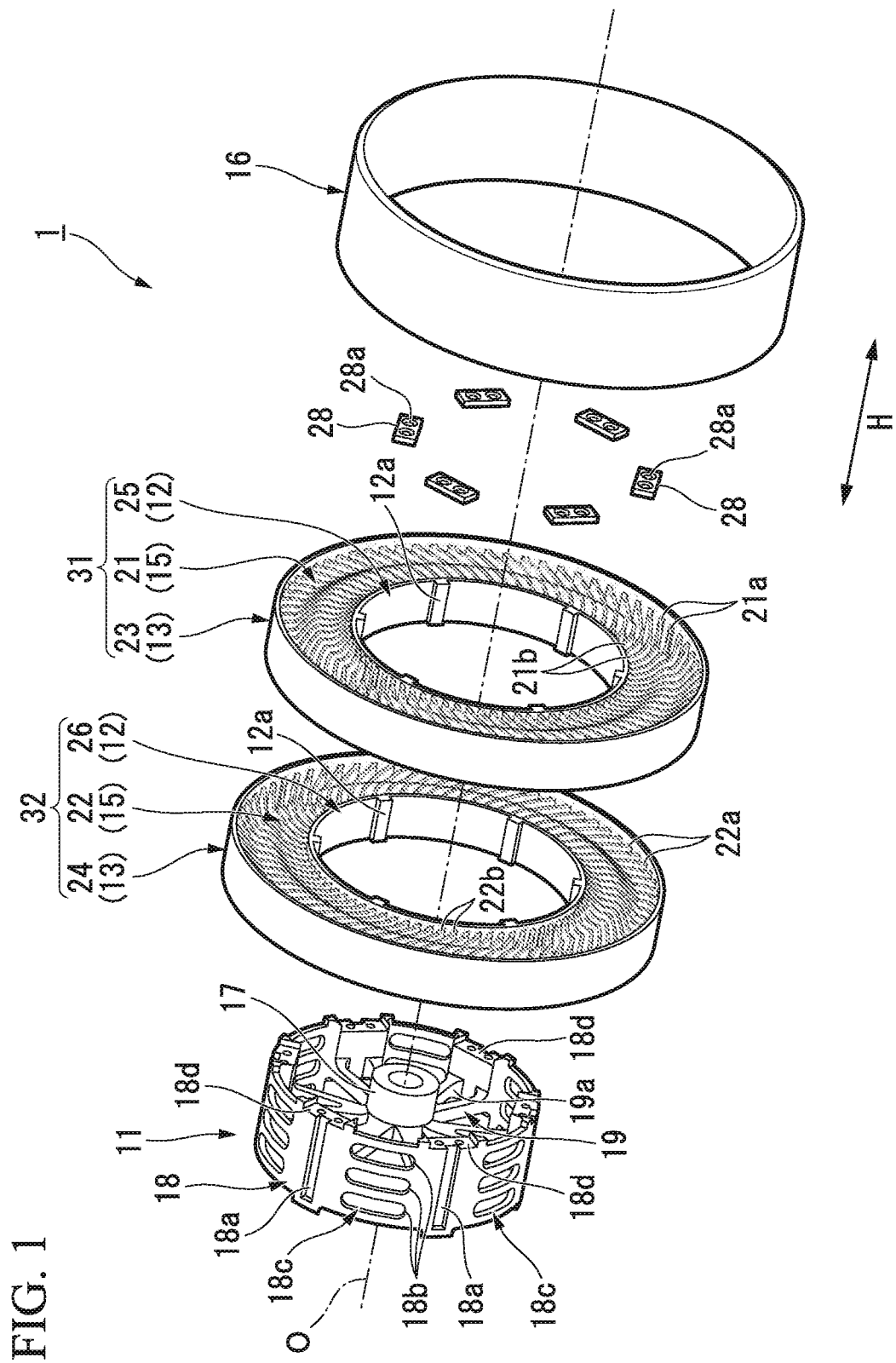
FIG. 1 is a view illustrating a non-pneumatic tire according to one embodiment of the present invention and is a schematic perspective view in which part of the non-pneumatic tire is disassembled.
Figure 2:
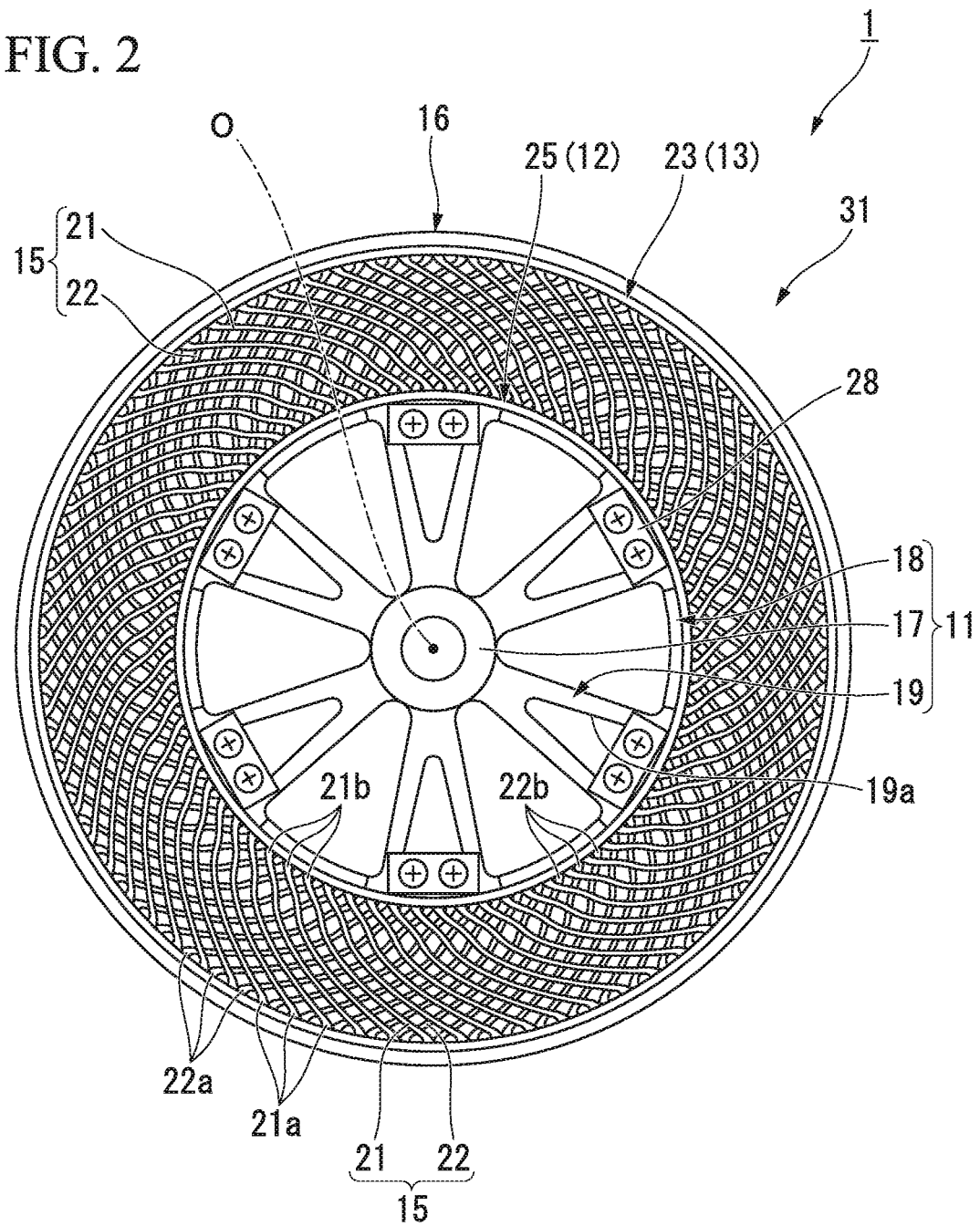
FIG. 2 is a tire side view when the non-pneumatic tire illustrated in FIG. 1 is viewed from one side in a tire width direction.

As illustrated in FIGS. 1 and 2, a non-pneumatic tire 1 of the present embodiment includes an attachment body 11 attached to an axle (not illustrated), a cylindrical ring-shaped body 13 which surrounds the attachment body 11 from the outside in a tire radial direction, a plurality of coupling members 15 arranged in a tire circumferential direction between the attachment body 11 and the ring-shaped body 13 and configured to couple the attachment body 11 and the ring-shaped body 13 in an elastically relatively displaceable manner, and a cylindrical tread member 16 which wraps externally around the ring-shaped body 13.

Also, the non-pneumatic tire 1 of the present embodiment may be employed in a wheelchair specified in Japanese Industrial Standard JIS T 9208, for example. In addition, the size of the non-pneumatic tire 1 is not particularly limited, but may be in a range of 3.00 to 8 or the like, for example.

Also, the non-pneumatic tire 1 may be employed for passenger cars. The size in this case is not particularly limited, but may be 155/65R 13 or the like.

The above-described attachment body 11, the ring-shaped body 13, and the tread member 16 are coaxially arranged on a common axis. Hereinafter, this common axis is referred to as an axis O, a direction along the axis O is referred to as a tire width direction H, a direction perpendicular to the axis O is referred to as a tire radial direction, and a direction of revolving around the axis O is referred to as a tire circumferential direction. Also, a central portion in the tire width direction H of the attachment body 11 and the tread member 16 and a central portion between the two ring-shaped bodies 13 are arranged in a state of being aligned with each other.

A fitting cylinder portion 17 to which a distal end of an axle is fitted, an outer ring portion 18 which surrounds the fitting cylinder portion 17 from the outside in the tire radial direction, and a plurality of ribs 19 which couple the fitting cylinder portion 17 and the outer ring portion 18 are provided in the attachment body 11.

The fitting cylinder portion 17, the outer ring portion 18, and the ribs 19 are integrally formed of a metal material such as an aluminum alloy, for example. The fitting cylinder portion 17 and the outer ring portion 18 are formed in a cylindrical shape and are coaxially arranged on the axis O. The plurality of ribs 19 are disposed at regular intervals in the circumferential direction, for example.

A plurality of key groove portions 18a recessed toward the inside in the tire radial direction and configured to extend in the tire width direction H are formed on an outer circumferential surface of the outer ring portion 18 at intervals in the tire circumferential direction. On the outer circumferential surface of the outer ring portion 18, the key groove portions 18a are open only on one side (outside the vehicle body) in the tire width direction H and are closed on the other side (inside the vehicle body) in the tire width direction H.

In the outer ring portion 18, a plurality of lightening holes 18b penetrating through the outer ring portion 18 in the tire radial direction are formed at intervals in the tire width direction H at portions positioned between key groove portions 18a adjacent to each other in the tire circumferential direction. A plurality of hole rows 18c configured by the plurality of lightening holes 18b are formed at intervals in the tire circumferential direction. Similarly, a lightening hole 19a penetrating through the ribs 19 in the tire width direction H is also formed in each of the ribs 19.

A concave portion 18d into which a plate 28 having a through hole 28a is fitted is formed at a position corresponding to the key groove portions 18a at an end edge on one side in the tire width direction H of the outer ring portion 18. The concave portion 18d is recessed toward the other side in the tire width direction H. Also, on a wall surface facing one side in the tire width direction H among wall surfaces constituting the concave portion 18d, an internal thread portion communicating with the through hole 28a of the plate 28 that is fitted into the concave portion 18d is formed.

Also, a plurality of through holes 28a are formed in the plate 28 at intervals in the tire circumferential direction.

Similarly, a plurality of internal thread portions are formed on the wall surface of the concave portion 18d at intervals in the tire circumferential direction. In the illustrated example, a case in which two through holes 28a and two internal thread portions are formed is taken as an example, but the number is not limited to two.

A cylindrical exterior body 12 which is externally fitted to the outer ring portion 18 is provided on the attachment body 11. A ridge portion 12a protruding toward the inside in the tire radial direction and extending over the entire length in the tire width direction H is formed on an inner circumferential surface of the exterior body 12. A plurality of ridge portions 12a are formed on the inner circumferential surface of the exterior body 12 at intervals in the tire circumferential direction and respectively engaged with the key groove portions 18a formed on the attachment body 11.

Thus, the exterior body 12 is fixed to the attachment body 11 by screwing bolts (not illustrated) into the internal thread portions through the through holes 28a of the plate 28 fitted into the concave portion 18d in a state in which the ridge portion 12a is engaged with the key groove portion 18a.

Also, among wall surfaces constituting the key groove portion 18a, a pair of side walls facing each other in the tire circumferential direction are formed to be perpendicular to a bottom wall surface. Similarly, among outer surfaces of the ridge portion 12a, a pair of side wall surfaces erected from the inner circumferential surface of the exterior body 12 and a top wall surface facing the inside in the tire radial direction are formed to be perpendicular to each other. Therefore, the sizes in the tire circumferential direction of the ridge portion 12a and the key groove portion 18a are equal to each other.

With the configuration as above, the ridge portion 12a is precisely engaged with the key groove portion 18a with little rattling.

The coupling member 15 couples an outer circumferential surface of the attachment body 11 and an inner circumferential surface of the ring-shaped bodies 13 in an elastically relatively displaceable manner. In the illustrated example, the coupling member 15 includes a first elastic coupling plate 21 and a second elastic coupling plate 22 which couple an outer circumferential surface of the exterior body 12 of the attachment body 11 and the inner circumferential surface of the ring-shaped bodies 13. Both of the first elastic coupling plate 21 and the second elastic coupling plate 22 are formed of an elastically deformable plate.

A plurality of first elastic coupling plates 21 are disposed in the tire circumferential direction at positions on one side in the tire width direction H. A plurality of second elastic coupling plates 22 are disposed in the tire circumferential direction at positions on the other side in the tire width direction H. That is, the plurality of first elastic coupling plates 21 and second elastic coupling plates 22 are disposed at intervals from each other in the tire width direction H and are disposed in the tire circumferential direction at respective positions. For example, 60 of the first elastic coupling plates 21 and the second elastic coupling plates 22 may be provided in the tire circumferential direction.

A plurality of coupling members 15 are each disposed at positions rotationally symmetrical with respect to the axis O between the exterior body 12 and the ring-shaped bodies 13. Also, all the coupling members 15 have the same shape and the same size, and the width of the coupling members 15 in the tire width direction H is smaller than the width of the ring-shaped body 13 in the tire width direction H.

Therefore, adjacent first elastic coupling plates 21 in the tire circumferential direction are not in contact with each other. Similarly, adjacent second elastic coupling plates 22 in the tire circumferential direction are not in contact with each other. Also, adjacent first elastic coupling plates 21 and second elastic coupling plates 22 in the tire width direction H are not in contact with each other. In addition, the first elastic coupling plates 21 and the second elastic coupling plates 22 have the same width in the tire width direction H and thickness.

Figure 3:
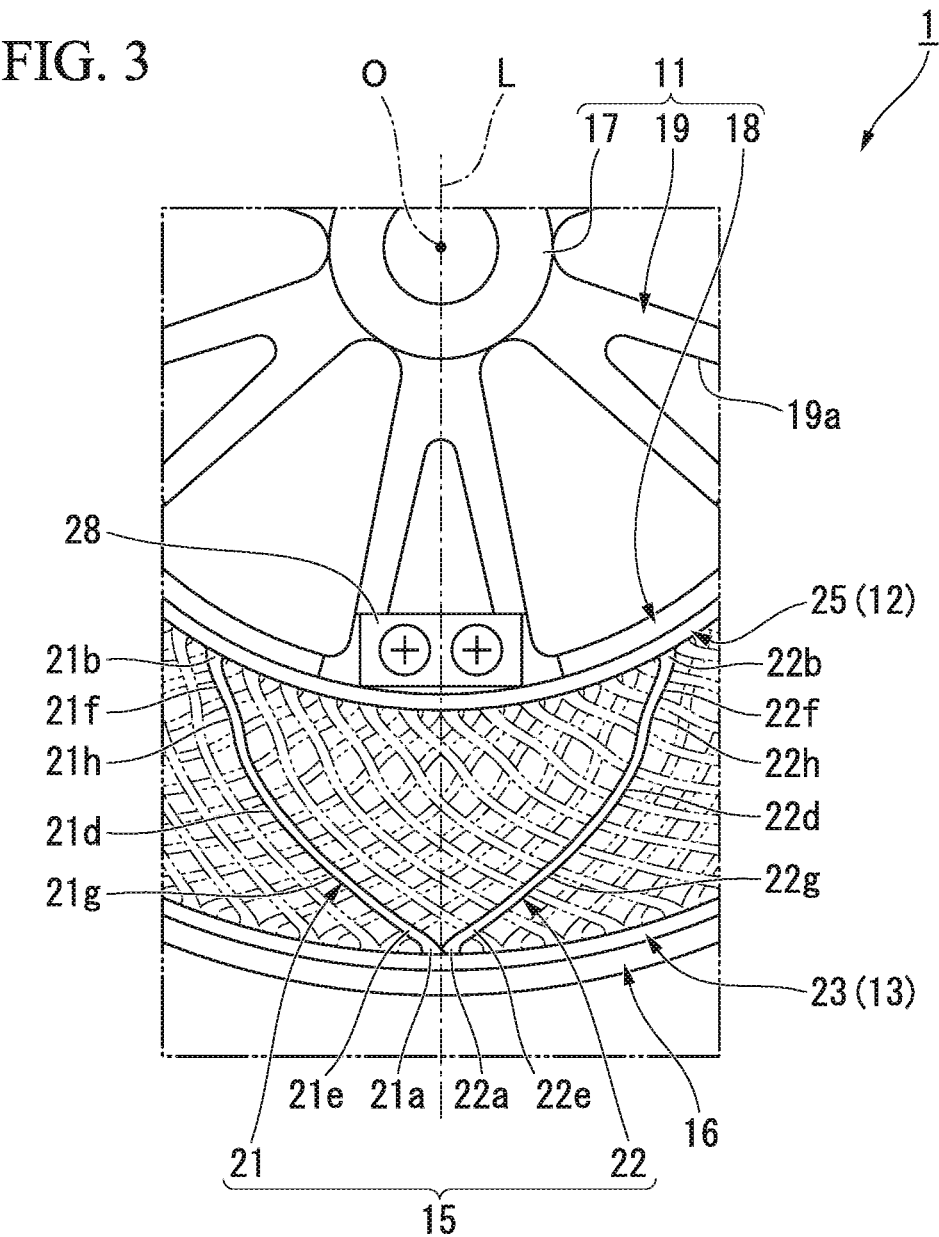
FIG. 3 is an enlarged view illustrating a main portion of FIG. 2.
Figure 4:
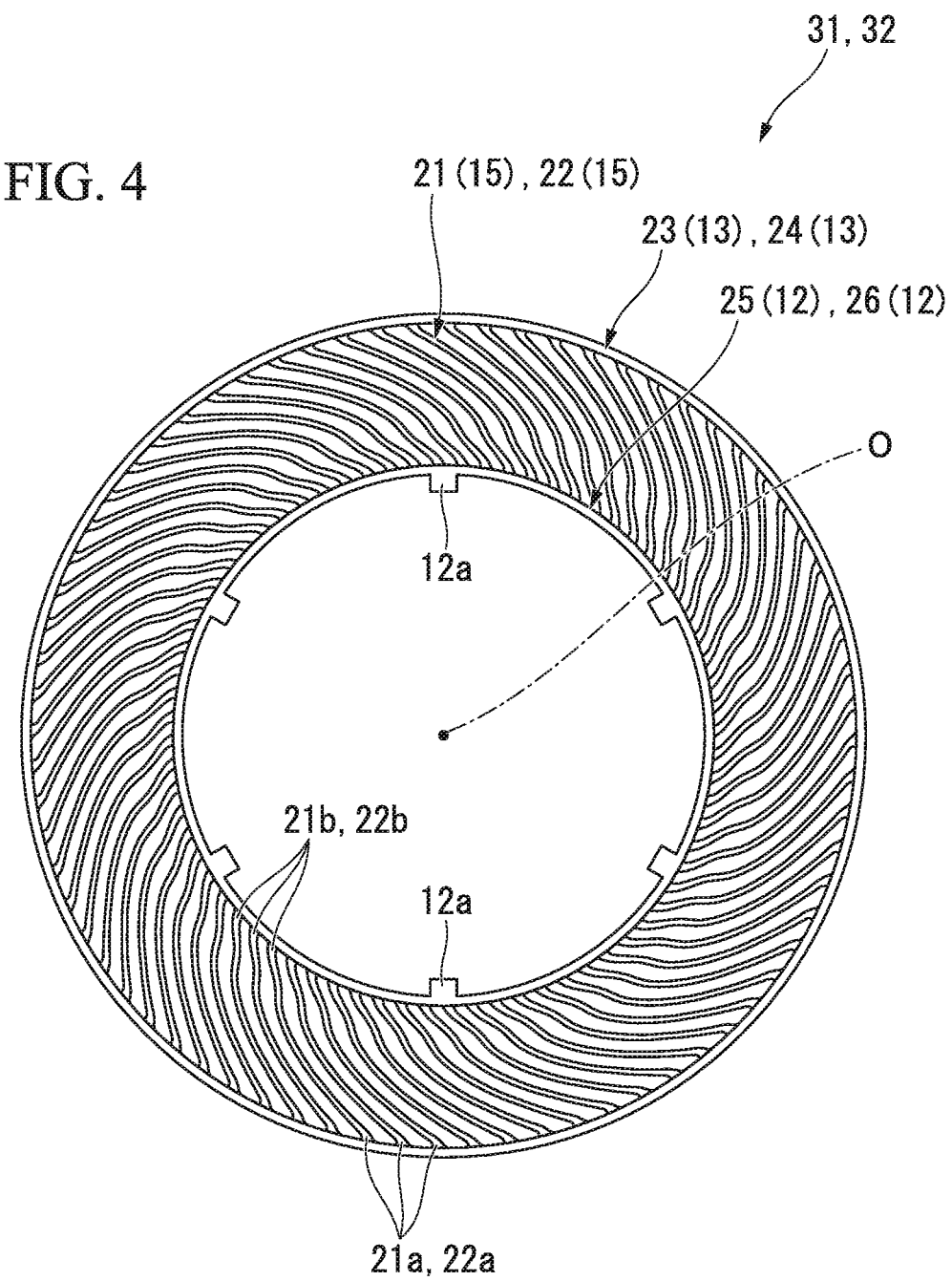
FIG. 4 is a tire side view when a first part case body is viewed from one side in a tire width direction or a tire side view when a second part case body is viewed from the other side in a tire width direction in the non-pneumatic tire illustrated in FIG. 1.

As illustrated in FIGS. 3 and 4, in the first elastic coupling plate 21, one end portion (an outer end portion 21a) coupled to the ring-shaped body 13 is positioned on one side in the tire circumferential direction of the other end portion (an inner end portion 21b) coupled to the exterior body 12. On the other hand, in the second elastic coupling plate 22, one end portion (an outer end portion 22a) coupled to the ring-shaped body 13 is positioned on the other side in the tire circumferential direction of the other end portion (an inner end portion 22b) coupled to the exterior body 12 (see FIG. 5).

Therefore, the respective outer end portions 21a and 22a of the first elastic coupling plate 21 and the second elastic coupling plate 22 which configure one coupling member 15 are coupled to the same position on the inner circumferential surface of the ring-shaped bodies 13 in the tire circumferential direction in a state in which their positions in the tire width direction H are different from each other.

Figure 6:
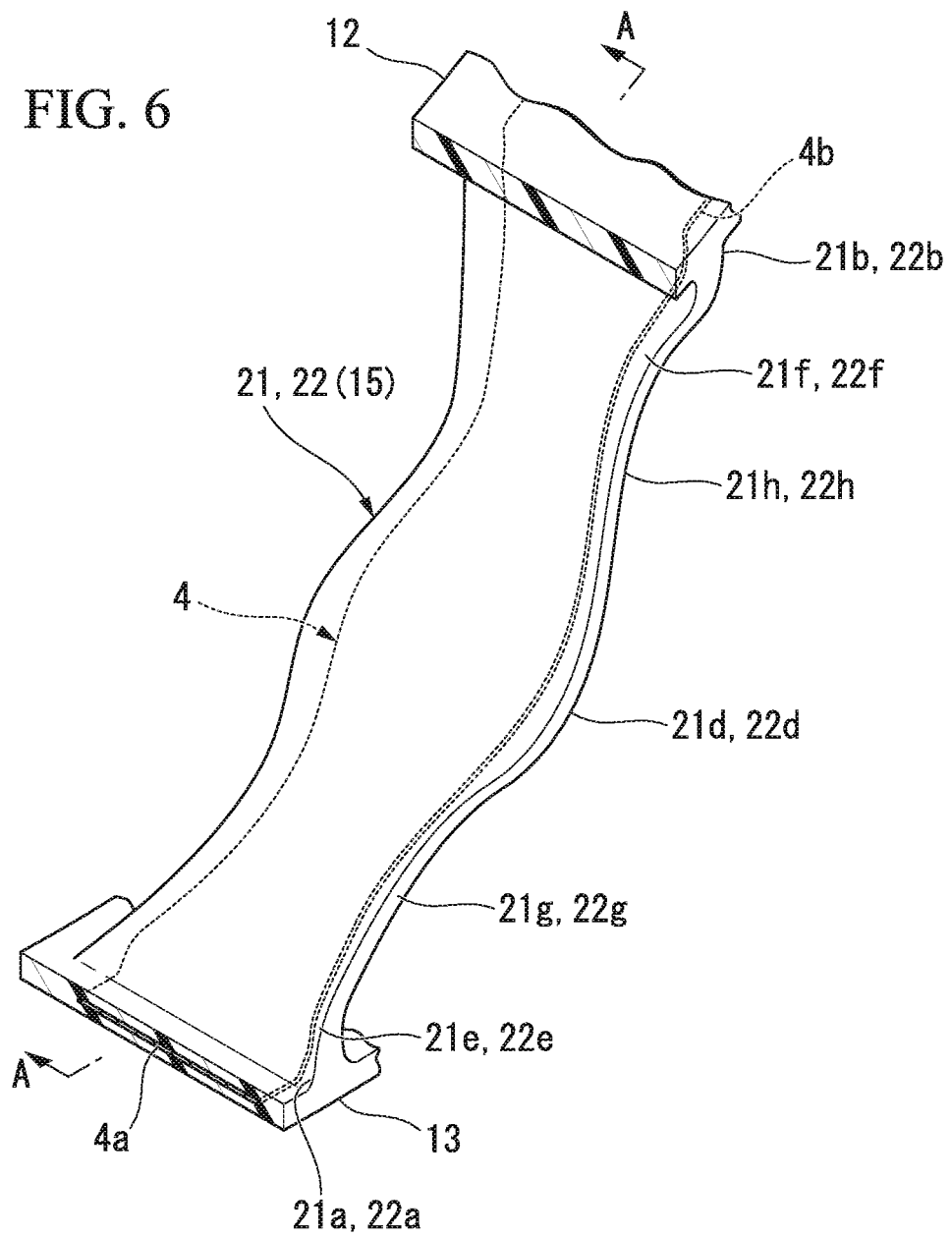
FIG. 6 is a perspective view in which a first elastic coupling plate or a second elastic coupling plate illustrated in FIG. 5 is cut off in a tire width direction.
Figure 7:
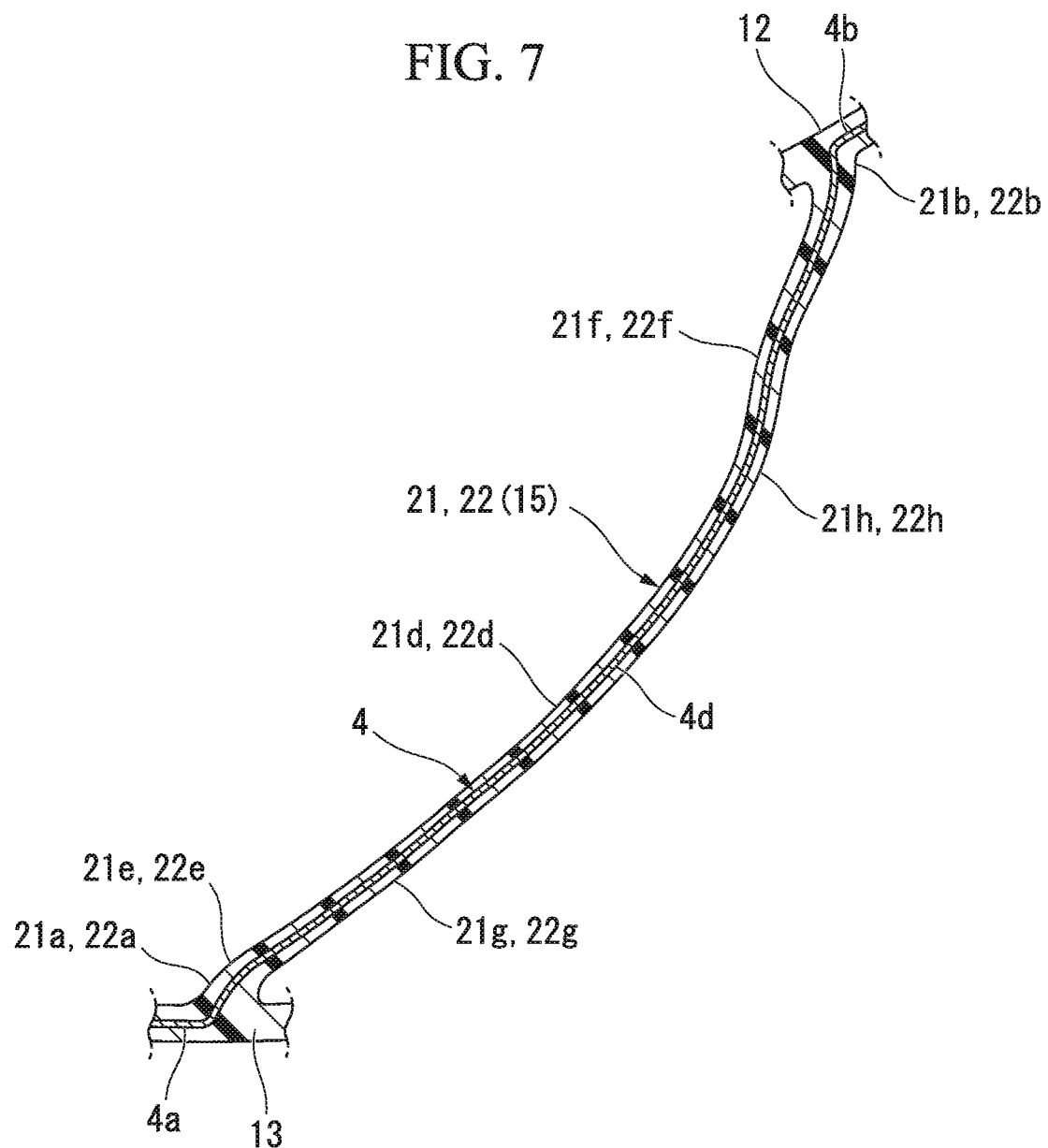
FIG. 7 is a cross-sectional view taken along line A-A illustrated in FIG. 6 and is a cross-sectional view of the first elastic coupling plate or the second elastic coupling plate sectioned in a tire circumferential direction.

As illustrated in FIGS. 3, 6, and 7, a plurality of curved portions 21d to 21f, and 22d to 22f which are curved in the tire circumferential direction are formed in the first elastic coupling plate 21 and the second elastic coupling plate 22 at intermediate portions positioned between the outer end portions 21a and 22a and the inner end portions 21b and 22b.

The plurality of curved portions 21d to 21f, and 22d to 22f are formed along an extending direction in which the first elastic coupling plate 21 and the second elastic coupling plate 22 extend in a tire side view when the non-pneumatic tire 1 is viewed from the tire width direction H. In the illustrated example, the plurality of curved portions 21d to 21f in the first elastic coupling plate 21 and the plurality of curved portions 22d to 22f in the second elastic coupling plate 22 are adjacent to each other in the extending direction while having curvature directions opposite to each other.

The plurality of curved portions 21d to 21f formed in the first elastic coupling plate 21 include a first curved portion 21d curved to protrude toward the other side in the tire circumferential direction, a second curved portion 21e positioned between the first curved portion 21d and the outer end portion 21a and curved to protrude toward one side in the tire circumferential direction, and a third curved portion 21f positioned between the first curved portion 21d and the inner end portion 21b and curved to protrude toward one side in the tire circumferential direction. The second curved portion 21e is continuous with the outer end portion 21a.

The plurality of curved portions 22d to 22f formed in the second elastic coupling plate 22 include a first curved portion 22d curved to protrude toward one side in the tire circumferential direction, a second curved portion 22e positioned between the first curved portion 22d and the outer end portion 22a and curved to protrude toward the other side in the tire circumferential direction, and a third curved portion 22f positioned between the first curved portion 22d and the inner end portion 22b and curved to protrude toward the other side in the tire circumferential direction. The second curved portion 22e is continuous with the outer end portion 22a.

In the illustrated example, the radii of curvature of the first curved portions 21d and 22d in a tire side view are larger than those of the second curved portions 21e and 22e and the third curved portions 21f and 22f, and the first curved portions 21d and 22d are disposed at central portions in the extending directions of the first elastic coupling plate 21 and the second elastic coupling plate 22.

Lengths of the first elastic coupling plate 21 and the second elastic coupling plate 22 are equal to each other. The inner end portions 21b and 22b of the first elastic coupling plate 21 and the second elastic coupling plate 22 are coupled, in a tire side view, to respective positions at the same distance on one side and the other side in the tire circumferential direction about the axis O on the outer circumferential surface of the exterior body 12 from a position facing the outer end portions 21a and 22a in the tire radial direction.

Also, the first curved portions 21d and 22d, the second curved portions 21e and 22e, and the third curved portions 21f and 22f in each of the first elastic coupling plate 21 and the second elastic coupling plate 22 have protruding directions which are opposite to each other in the tire circumferential direction while they are the same in size.

With the configuration as above, as illustrated in FIG. 3, a shape of each coupling member 15 in a tire side view is symmetrical with respect to a virtual line L extending in the tire radial direction and passing through the outer end portions 21a and 22a of each of the first elastic coupling plate 21 and the second elastic coupling plate 22.

In addition, as illustrated in FIGS. 3, 6, and 7, inflection portions 21g, 21h, 22g and 22h are formed in the first elastic coupling plate 21 and the second elastic coupling plate 22 at portions positioned between each of the curved portions 21d to 21f, and 22d to 22f adjacent to each other in the extending direction of the coupling plates 21 and 22.

The inflection portions 21g, 21h, 22g and 22h are formed to have a smaller area of transverse section surface (a transverse section area) perpendicular to the extending direction than that of other portions in the first elastic coupling plate 21 and the second elastic coupling plate 22, and are positioned at boundary regions of each of the curved portions 21d to 21f and 22d to 22f adjacent to each other in the extending direction in each of the first elastic coupling plate 21 and the second elastic coupling plate 22.

In the illustrated example, each transverse section area in the extending direction of the first elastic coupling plate 21 and the second elastic coupling plate 22 is formed to gradually decrease in size in a direction toward the inflection portions 21g, 21h, 22g and 22h.

The above-described exterior body 12, the ring-shaped bodies 13, and the plurality of coupling members 15 are integrally formed of a synthetic resin material, for example. The synthetic resin material may be, for example, a single resin material, a mixture containing two or more kinds of resin material, or a mixture containing one or more kinds of resin material and one or more kinds of elastomer, and furthermore, may include additives such as anti-aging agents, plasticizers, fillers, or pigments, for example.

Figure 8:
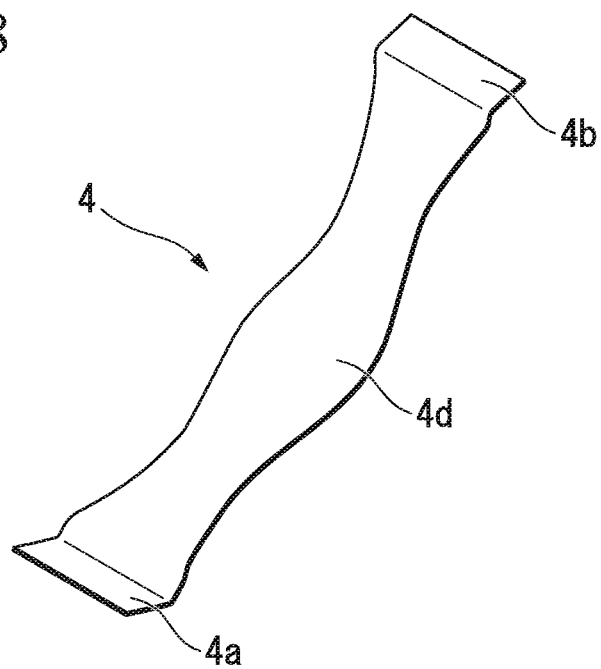
FIG. 8 is a perspective view of a first reinforcing member embedded in the first elastic coupling plate or the second elastic coupling plate illustrated in FIG. 6.

As illustrated in FIGS. 6 to 8, a reinforcing member 4 made of a metal is embedded in the coupling members 15 in the extending direction. The reinforcing member 4 is formed to follow side edges of the first elastic coupling plate 21 and the second elastic coupling plate 22 when viewed from the tire circumferential direction. In other words, the reinforcing member 4 has curved portions and inflection portions formed in the extending direction and corresponding to the curved portions 21d to 21f, and 22d to 22f and the inflection portions 21g, 21h, 22g and 22h of the first elastic coupling plate 21 and the second elastic coupling plate 22.

As a material of the reinforcing member 4, a material having a higher rigidity (such as a metal) than a synthetic resin material used for a spoke can be used, for example.

The opposite end portions 4a and 4b in the extending direction of the reinforcing member 4 respectively reach the inside of the exterior body 12 of the attachment body 11 and the ring-shaped bodies 13 and are embedded therein. Each of the end portions 4a and 4b in the tire circumferential direction are set to have a length such that they do not come into contact with end portions 4a and 4b of adjacent reinforcing members 4 in the tire circumferential direction.

Also, the thickness of the reinforcing member 4 may be formed to be the same thickness in the extending direction or be partially different thicknesses. In addition, the reinforcing member 4 is positioned at substantially a central portion in a thickness direction of the first elastic coupling plate 21 and the second elastic coupling plate 22. As described above, the reinforcing member 4 is covered by a resin over its entire surface and is not exposed. Therefore, occurrence of rust in the reinforcing member 4 can be prevented, for example.

Incidentally, as illustrated in FIG. 1, the exterior body 12 is divided into a first exterior body 25 positioned on one side in the tire width direction H and a second exterior body 26 positioned on the other side in the tire width direction H. Similarly, the ring-shaped body 13 is divided into a first ring-shaped body 23 positioned on one side in the tire width direction H and a second ring-shaped body 24 positioned on the other side in the tire width direction H.

In the illustrated example, each of the exterior body 12 and the ring-shaped body 13 is divided at the central portion in the tire width direction H.

Also, the first exterior body 25 and the first ring-shaped body 23 are integrally formed with the first elastic coupling plate 21, for example, by injection molding. The second exterior body 26 and the second ring-shaped body 24 are integrally formed with the second elastic coupling plate 22, for example, by injection molding. That is, the exterior body 12 to which the coupling member 15 is coupled in the attachment body 11, the ring-shaped body 13, and the coupling member 15 are integrally formed of a synthetic resin material.

Hereinafter, a unit in which the first exterior body 25, the first ring-shaped body 23, and the first elastic coupling plate 21 are integrally formed is referred to as a first part case body 31, and a unit in which the second exterior body 26, the second ring-shaped body 24, and the second elastic coupling plate 22 are integrally formed is referred to as a second part case body 32.

Also, when the first part case body 31 is taken as an example, injection molding methods available to be used include a general method of molding the entire first part case body 31 at once, insert molding in which the remaining portions other than insert parts are injection molded with some portions among the first exterior body 25, the first ring-shaped body 23, and the first elastic coupling plate 21 being provided as the insert parts, a so-called two-color molding, or the like. In addition, when the entirety of the first part case body 31 is injection-molded at once, the plurality of ridge portions 12a formed on the exterior body 12 may be a gate portion.

These points apply to the second part case body 32.

Also, at the time of injection-molding, when the first part case body 31 is taken as an example, the first exterior body 25, the first ring-shaped body 23, and the first elastic coupling plate 21 may be formed of different materials, and may be formed of the same material. As such a material, metal materials or resin materials are examples, however, resin materials, particularly thermoplastic resins, are preferable from the perspective of reducing weight.

These points apply to the second part case body 32.

The first ring-shaped body 23 and the second ring-shaped body 24 are coupled to each other, by welding, fusing, bonding end edges thereof facing each other in the tire width direction, or the like, for example. Also, in the case of welding, hot plate welding may be employed, for example. Similarly, end edges of the first exterior body 25 and the second exterior body 26 facing each other in the tire width direction H are in contact with each other.

As illustrated in FIG. 1, the first part case body 31 and the second part case body 32 have the same shape and the same size. Also, when the first part case body 31 and the second part case body 32 are integrally coupled as described above, end edges of the first ring-shaped body 23 and the second ring-shaped body 24 abut each other in the tire width direction H and are coupled in a state in which directions of the first part case body 31 and the second part case body 32 are opposite to each other in the tire width direction H while the first part case body 31 and the second part case body 32 are positioned in the tire circumferential direction so that each of the coupling members 15 is line-symmetrical in the tire side view as described above.

Thereafter, the non-pneumatic tire 1 can be obtained by providing the tread member 16 to the first part case body 31 and the second part case body 32 which are integrally combined.

Also, the reinforcing member 4 is prepared in advance by press processing or the like and is set in the injection mold before the first elastic coupling plate 21 and the second elastic coupling plate 22 are injection-molded. Thereafter, the first elastic coupling plate 21 and the second elastic coupling plate 22 with the reinforcing member 4 embedded therein can be formed by injecting synthetic resin material into the injection mold. In addition, a magnet may be used to hold the metallic reinforcing member 4 in the injection mold for the setting.

Also, a molding method in which only the exterior body 12 and the ring-shaped body 13 are injected after the first elastic coupling plate 21 and the second elastic coupling plate 22 with the reinforcing member 4 embedded therein are set in the injection mold may be used. In this case, the first elastic coupling plate 21 and the second elastic coupling plate 22 can be formed of a different resin from that of the exterior body 12 and the ring-shaped body 13. For example, as a resin of the first elastic coupling plate 21 and the second elastic coupling plate 22, it is possible to select a material that is less easily cracked than that of the exterior body 12 and the ring-shaped body 13. In this case, the holding in the injection mold can be done by press-fitting.

Figure 5:
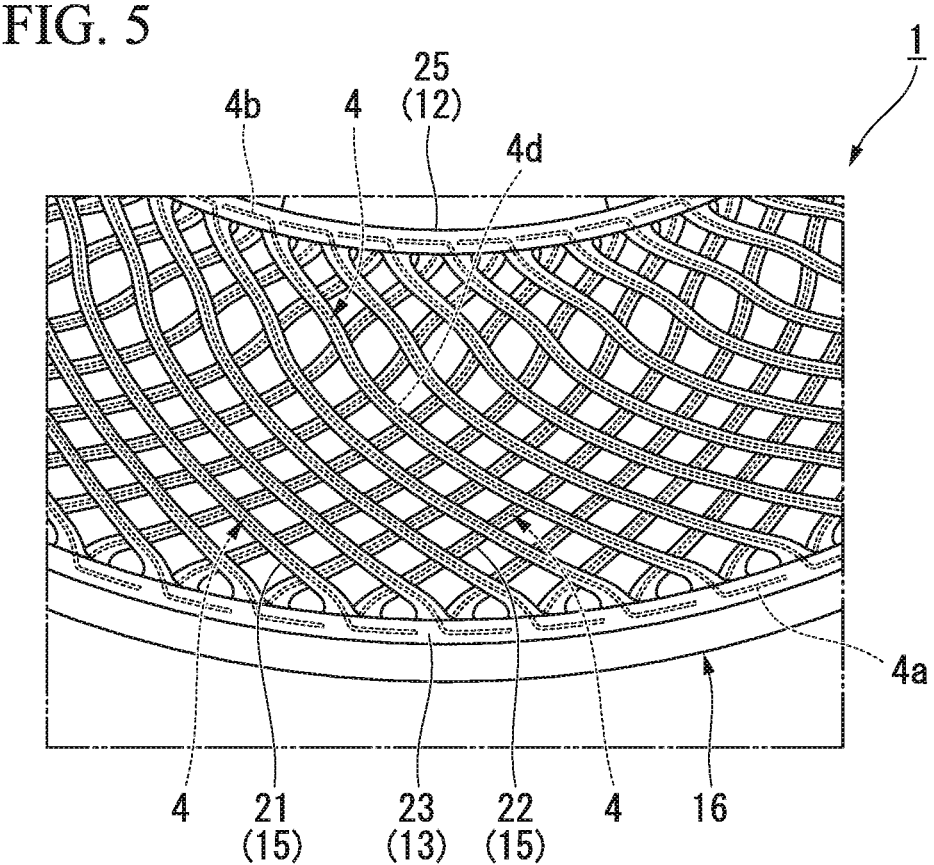
FIG. 5 is an enlarged view illustrating a main portion of the tire side surface illustrated in FIG. 2.

As illustrated in FIG. 5, the tread member 16 is formed in a cylindrical shape and integrally covers the outer circumferential surface side of the ring-shaped body 13 over the entire region. The tread member 16 is formed of natural rubber and/or vulcanized rubber in which the rubber composition is vulcanized, a thermoplastic material, or the like, for example.

As the thermoplastic material, a thermoplastic elastomer, a thermoplastic resin, or the like is an example. As thermoplastic elastomers, amide-based thermoplastic elastomers (TPA), ester-based thermoplastic elastomers (TPC), olefin-based thermoplastic elastomers (TPO), styrene-based thermoplastic elastomers (TPS), urethane-based thermoplastic elastomers (TPU), a thermoplastic rubber cross-linker (TPV), other thermoplastic elastomers (TPZ), or the like, specified in Japanese Industrial Standard JIS K6418, are examples.

As the thermoplastic resin, urethane resins, olefin resins, vinyl chloride resins, polyamide resins, or the like are examples. Also, it is preferable to form the tread member 16 with a vulcanized rubber from the perspective of wear resistance.

In the non-pneumatic tire 1 of the present embodiment with the configuration as above, as illustrated in FIGS. 6 to 8, since the reinforcing member 4 is embedded in the coupling member 15 formed of a synthetic resin material, durability of the coupling member 15 can be improved. In addition, since the strength of the coupling member 15 can be adjusted by the reinforcing member 4, it is possible to select a synthetic resin material according to usage conditions or applications, and thereby a range of selection of the synthetic resin material forming the coupling member 15 can be expanded. Particularly, in the non-pneumatic tire 1 of the present embodiment, flexibility can be provided to the first elastic coupling plate 21 and the second elastic coupling plate 22 due to the presence of the curved portions, and the curved portions 21d to 21f, and 22d to 22f on which stress is easily concentrated due to the compression of the tire in the first elastic coupling plate 21 and the second elastic coupling plate 22 can be reliably reinforced by the reinforcing member 4. Therefore, durability of the coupling member 15 can be secured while riding comfort is improved.

Also, in the non-pneumatic tire 1 of the present embodiment, as illustrated in FIG. 1, since the exterior body 12, the ring-shaped body 13, and the coupling member 15 are integrally formed of a synthetic resin material and the end portions 4a and 4b of the reinforcing member 4 are embedded and fixed in the exterior body 12 and the ring-shaped body 13, it is possible to effectively reinforce the coupling member 15 (the first elastic coupling plate 21 and the second elastic coupling plate 22).

Next, modified examples according to the non-pneumatic tire of the present invention will be described on the basis of the accompanying drawings, but members and portions the same as or similar to those in the embodiment described above will be given the same reference signs and description thereof will be omitted, and configurations different from those of the embodiment will be described.

First Modified Example

Figure 9:
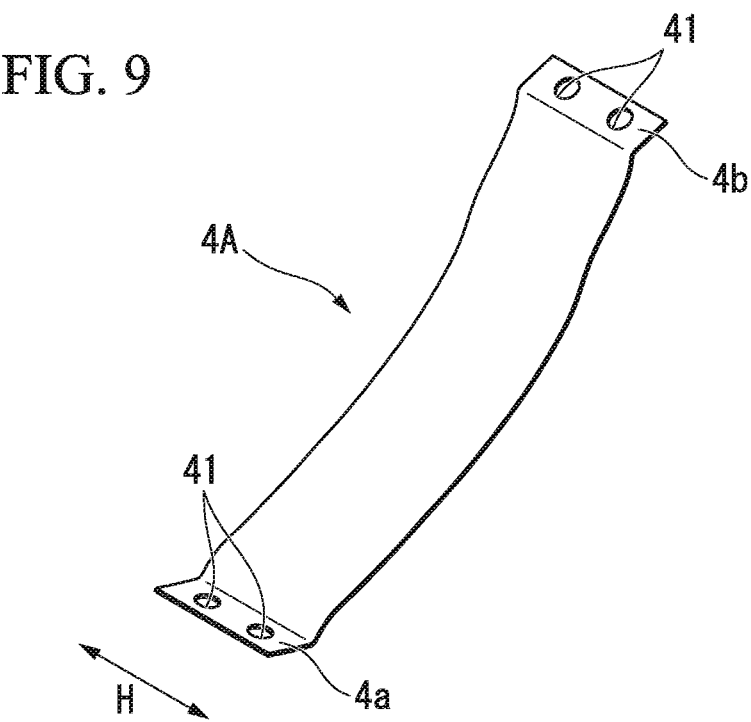
FIG. 9 is a perspective view illustrating a configuration of a reinforcing member according to a first modified example.

As illustrated in FIG. 9, a pair of first through holes 41 into which a synthetic resin material enters and is fixed to are formed at opposite end portions 4a and 4b of a reinforcing member 4A according to the first modified example. Two first through holes 41 are arranged at the respective end portions 4a and 4b in the tire width direction H. In addition, the reinforcing member 4A according to the first modified example has the same width in the tire width direction H over the entire extending direction.

In this case, since the synthetic resin material enters the inside of the first through holes 41 and is in a firmly fixed state at the time of injection molding, the opposite end portions 4a and 4b are firmly coupled and it is possible to reliably prevent the reinforcing member 4A from being separated from the coupling member 15 (see FIG. 6).

The first through holes 41 may be provided at either side of the opposite end portions 4a and 4b. Also, the number of first through hole 41 at each of the end portions 4a and 4b is not limited to two, and may be one, three, or more. In addition, configurations of the sizes, positions, hole shapes, and the like of the first through holes 41 can be arbitrarily set.

Second Modified Example

Figure 10:
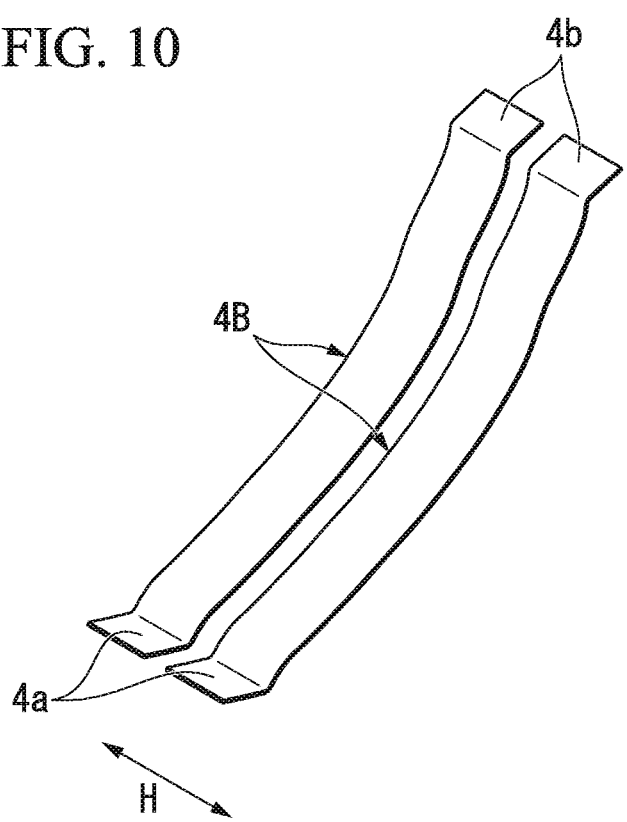
FIG. 10 is a perspective view illustrating a configuration of a reinforcing member according to a second modified example.

As illustrated in FIG. 10, a reinforcing member 4B according to the second modified example has a configuration in which the reinforcing member 4A of the first modified example described above (see FIG. 9) is divided into two in the tire width direction H. That is, two reinforcing members 4B and 4B are embedded in one of the first elastic coupling plate 21 and the second elastic coupling plate 22. In addition, the first through holes 41 of the first modified example are not provided in the reinforcing member 4B.

In the reinforcing member 4B according to the second modified example, since the width in the tire width direction H can be decreased compared to the reinforcing member 4A which is not divided in the tire width direction H as in the above-described embodiment, material costs can be reduced and lightening of the member can be achieved.

Also, there is no limitation to the reinforcing member 4B being divided in the tire width direction H over the entire length in the extending direction as in the present second modified example, and a portion of the part reinforcing members may be coupled to each other. For example, a configuration in which the part reinforcing members are coupled at the end portion 4a on the ring-shaped body 13 side in which stress concentration is large and the radial inner side therefrom is divided in the tire width direction H is possible.

Also, although the reinforcing member 4B of the present second modified example is configured to be divided into two in the tire width direction H, the number of part portions[GF2] can be three or more as a matter of course.

Third Modified Example

Figure 11:
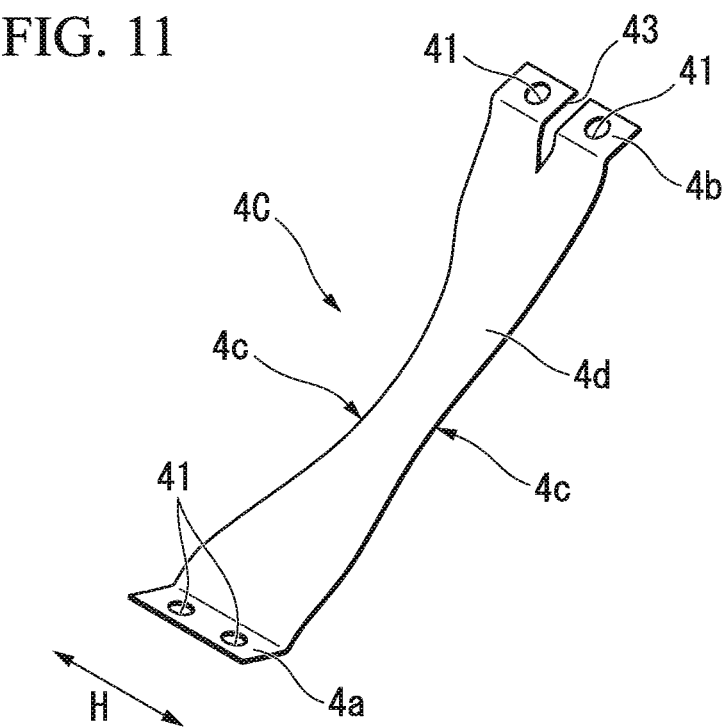
FIG. 11 is a perspective view illustrating a configuration of a reinforcing member according to a third modified example.

As illustrated in FIG. 11, a reinforcing member 4C according to the third modified example includes a notch 43 formed at a central portion in the tire width direction H of at least one of the end portions 4a and 4b (the end portion of the reference sign 4b in FIG. 11) and a concave portion 4c formed such that the width in the tire width direction H of a main body portion 4d (a portion other than the opposite end portions 4a and 4b) gradually decreases from opposite end portions 4a and 4b toward the central portion in the extending direction. Also, similar to the first modified example, the first through holes 41 are formed at each of the opposite end portions 4a and 4b of the reinforcing member 4. In the end portion 4b in which the notch 43 is formed, the first through holes 41 are respectively disposed on opposite portions of the notch 43.

In this case, since the synthetic resin material enters the inside of the notch 43 formed at the end portion 4b at the time of injection molding and is in a firmly fixed state in addition to the operation and effects of the above-described modified examples, the end portion 4b is more firmly coupled and it is possible to reliably prevent the reinforcing member 4C from being separated from the coupling member 15.

Also, since the notch 43 is not on the side of the ring-shaped body 13 on which stress is easily concentrated, such an operation and effects can be achieved without excessively decreasing a strengthening effect on the coupling member 15 (the first elastic coupling plate 21 and the second elastic coupling plate 22) due to the reinforcing member 4.

Fourth Modified Example

Figure 12:
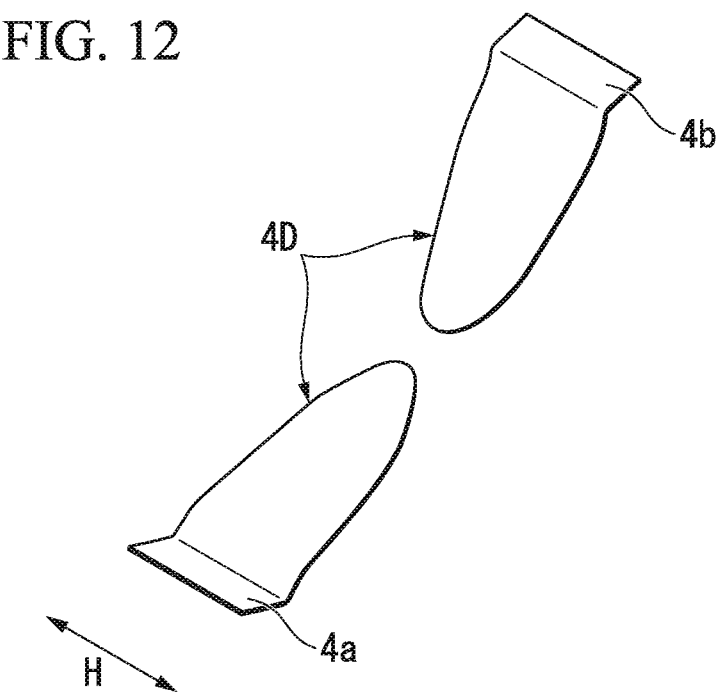
FIG. 12 is a perspective view illustrating a configuration of a reinforcing member according to a fourth modified example.

As illustrated in FIG. 12, a reinforcing member 4D according to the fourth modified example is divided into two at the central portion in the extending direction. Each of the part reinforcing members 4D[GF3] has a shape in which the width thereof in the tire width direction H gradually decreases from the side of opposite end portions 4a and 4b toward the central portion, and there is a configuration in which the reinforcing member is not disposed at the central portion in the extending direction of the first elastic coupling plate 21 or the second elastic coupling plate 22.

In this case, since an extent a length occupies in the extending direction can be reduced compared with the reinforcing member 4A which is not divided in the extending direction as in the above-described embodiment, costs of the member can be reduced and lightening of the member can be achieved.

Also, although the reinforcing member 4D of the present fourth modified example is configured to be divided into two in the extending direction, the number of part portions[GF4] can be three or more as a matter of course.

Fifth Modified Example

Figure 13:
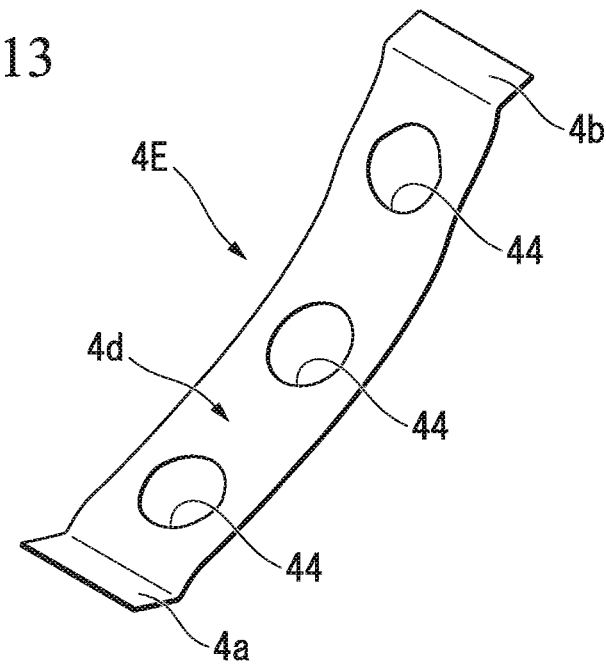
FIG. 13 is a perspective view illustrating a configuration of a reinforcing member according to a fifth modified example.

In the fifth modified example as illustrated in FIG. 13, a reinforcing member 4E is configured to have a plurality of second through holes 44 (here, three) formed in the extending direction of the main body portion 4d provided in the first elastic coupling plate 21 or the second elastic coupling plate 22.

In this case, since the synthetic resin material enters the inside of the second through holes 44 and is in a firmly fixed state at the time of injection molding, it is possible to reliably prevent the reinforcing member 4E from being separated from the coupling member 15.

In addition, the number, sizes, positions, hole shapes, and the like of the second through holes 44 can be arbitrarily set.

Sixth Modified Example

Figure 14:
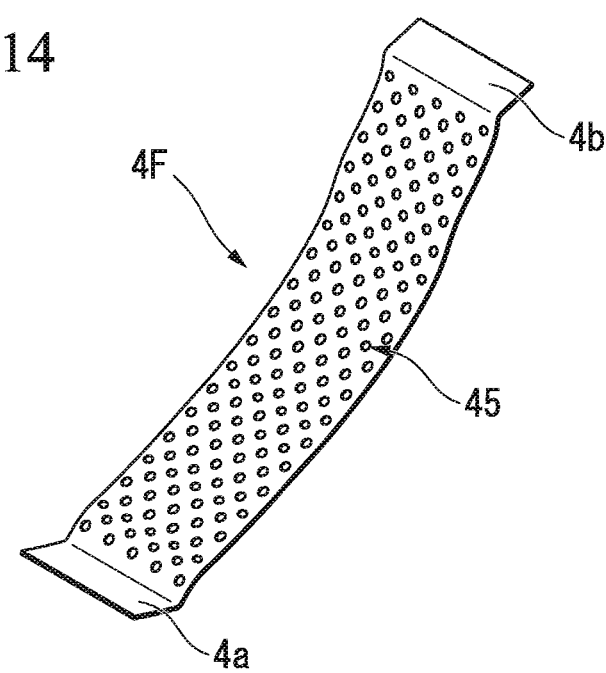
FIG. 14 is a perspective view illustrating a configuration of a reinforcing member according to a sixth modified example.

As illustrated in FIG. 14, a reinforcing member 4F according to the sixth modified example has a configuration which includes porous penetration portions 45 (through holes) penetrating in a thickness direction over the entire main body portion 4d provided in the first elastic coupling plate 21 or the second elastic coupling plate 22.

In this case, since the synthetic resin material enters each small hole of the porous penetration portions 45 and is in a firmly fixed state at the time of injection molding, it is possible to reliably prevent the reinforcing member 4F from being separated from the coupling member 15.

In addition, the number of holes, hole sizes, disposition regions, and the like of the porous penetration portions 45 can be arbitrarily set.

Seventh Modified Example

Figure 15:
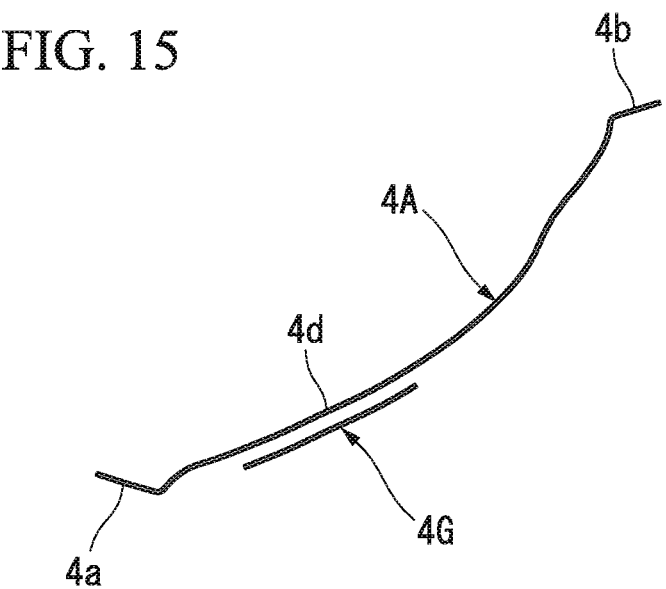
FIG. 15 is a perspective view illustrating a configuration of a reinforcing member according to a seventh modified example.

As shown in FIG. 15, a reinforcing member 4G according to the seventh modified example is disposed to overlap a curved portion, in the tire circumferential direction, in which a particularly large stress concentration occurs in the first elastic coupling plate 21 or the second elastic coupling plate 22 in the reinforcing member 4 of the above-described embodiment.

In addition, although the reinforcing member 4G of the present modified example is disposed to overlap a portion of the main body portion 4d of the reinforcing member 4 in the tire circumferential direction, the reinforcing member 4G is not limited to this position and it is even possible for two thereof to be disposed on the opposite end portions 4a and 4b.

In this case, since the reinforcing member 4G is simply disposed at an appropriate position at the time of injection molding, reinforcement of a limited portion of the coupling member 15 on which the stress is concentrated can be performed easily.

Eighth Modified Example

Figure 16:
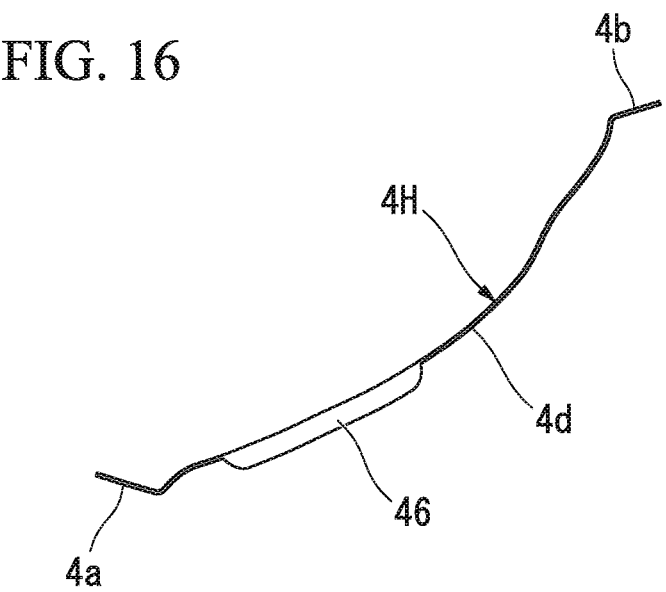
FIG. 16 is a perspective view illustrating a configuration of a reinforcing member according to an eighth modified example.

As illustrated in FIG. 16, a reinforcing member 4H according to the eighth modified example is configured to include a bulging portion 46 which is formed such that a thickness thereof increases in a curved portion in which a particularly large stress concentration occurs in the first elastic coupling plate 21 or the second elastic coupling plate 22 in the reinforcing member 4 of the above-described embodiment. In addition, although the bulging portion 46 of the present modified example is provided in the main body portion 4d of the reinforcing member 4H, the bulging portion 46 is not limited to this position and can also be provided at the opposite end portions 4a and 4b.

In the present eighth modified example, reinforcement of a limited portion of the coupling member 15 on which the stress is concentrated can be performed easily.

In addition, the technical scope of the present invention is not limited to the above embodiments, and various changes can be made without departing from the spirit and scope of the present invention.

For example, configurations of the reinforcing member including shapes, positions, the number thereof, and the like are not limited to the present embodiment and the modified examples, and although it is preferable that the reinforcing member be embedded at least in a curved portion in the elastic coupling plate (the first elastic coupling plate 21 or the second elastic coupling plate 22), it is not particularly limited thereto.

Also, the coupling member 15 may have a configuration not having a plurality of inflection portions. For example, it is possible to have a shape whose width gradually decreases from the outer end portion 21a and the inner end portion 21b toward the central portion in the extending direction of the coupling member 15.

Also, although the configuration of the coupling member 15 being provided with one of each of the first elastic coupling plate 21 and the second elastic coupling plate 22 has been described in the present embodiment, instead of this, a plurality of first elastic coupling plates 21 and second elastic coupling plates 22 having different positions from each other in the tire width direction H may be provided for one coupling member 15. Also, a plurality of coupling members 15 may be provided between the exterior body 12 and the ring-shaped body 13 in the tire width direction H.

Also, instead of the above-described embodiment, for example, the inner end portions 21b and 22b of the first elastic coupling plate 21 and the second elastic coupling plate 22 may be coupled to each of opposite positions with the axis O therebetween in the tire radial direction on the circumferential surface of the exterior body 12 or may be coupled to positions, on the circumferential surface of the exterior body 12, facing the outer end portions 21a and 22a of the first elastic coupling plate 21 and the second elastic coupling plate 22 in the tire radial direction, or the like. In addition, instead of the above-described embodiment, the outer end portions 21a and 22a of the first elastic coupling plate 21 and the second elastic coupling plate 22 may be coupled to the inner circumferential surface of the ring-shaped body 13 while positions thereof in the tire circumferential direction are made to be different from each other.

Further, in the present embodiment, a gap in the tire width direction H may or may not be provided between the first exterior body 25 and the second exterior body 26. Also, the exterior body 12 and the ring-shaped body 13 may or may not be divided into three or more in the tire width direction H.

Furthermore, the first exterior body 25 and the second exterior body 26 may be integrally formed.

In addition, in the above embodiment, the exterior body 12, the ring-shaped body 13, and the coupling member 15 are integrally formed by injection molding, for example, but the present invention is not limited to injection molding, and they may be integrally formed by casting or the like, for example. Also, the exterior body 12, the ring-shaped body 13, and the coupling member 15 may be individually formed and coupled to each other.

In addition, the above-described embodiment is configured to indirectly couple the coupling member 15 to the outer ring portion 18 of the attachment body 11 with the exterior body 12 interposed therebetween, but the present invention is not limited thereto, and it may be configured to directly couple the coupling member 15 to the outer ring portion 18 of the attachment body 11, for example.

In addition, the components in the above-described embodiments can be appropriately replaced with well-known components without departing from the spirit and scope of the present invention.

INDUSTRIAL APPLICABILITY

According to the present invention, durability of a coupling member can be improved and a range of selection of synthetic resin materials forming the coupling member can be expanded.

REFERENCE SIGNS LIST

1 Non-pneumatic tire
4, 4A to 4H Reinforcing member
4a, 4b End portion
4d Main body portion
11 Attachment body
12 Exterior body
13 Ring-shaped body
15 Coupling member
16 Tread member
18 Outer ring portion
21 First elastic coupling plate
21a Outer end portion
21b Inner end portion
22 Second elastic coupling plate
22a Outer end portion
22b Inner end portion
41 First through hole
43 Notch
44 Second through hole
45 Porous penetration portion (through hole)
O Axis
H Tire width direction

The invention claimed is:

1. A non-pneumatic tire comprising:
an attachment body attached to an axle;
a ring-shaped body which surrounds the attachment body from the outside in a tire radial direction; and
a coupling member which displaceably couples the attachment body and the ring-shaped body,
wherein the coupling member is formed of a synthetic resin material and includes a reinforcing member made of metal embedded therein, and
the reinforcing member is formed to follow side edges of the coupling member along an extending direction of the coupling member.

2. The non-pneumatic tire according to claim 1, wherein:
the coupling member includes an elastic coupling plate whose opposite end portions are respectively coupled to the attachment body and the ring-shaped body;
a curved portion curved in a tire circumferential direction is formed in the elastic coupling plate; and
the reinforcing member is embedded at least in the curved portion in the elastic coupling plate.

3. The non-pneumatic tire according to claim 2, wherein a through hole into which the synthetic resin material enters and is fixed to is formed in the reinforcing member.

4. The non-pneumatic tire according to claim 2, wherein:
a portion of the attachment body to which at least the coupling member is coupled, the ring-shaped body, and the coupling member are integrally formed of a synthetic resin material; and
an end portion of the reinforcing member reaches the inside of at least one of the attachment body and the ring-shaped body.

5. The non-pneumatic tire according to claim 4, wherein a through hole into which the synthetic resin material enters and is fixed to is formed in the reinforcing member.

6. The non-pneumatic tire according to claim 1, wherein:
a portion of the attachment body to which at least the coupling member is coupled, the ring-shaped body, and the coupling member are integrally formed of a synthetic resin material; and
an end portion of the reinforcing member reaches the inside of at least one of the attachment body and the ring-shaped body.

7. The non-pneumatic tire according to claim 6, wherein a through hole into which the synthetic resin material enters and is fixed to is formed in the reinforcing member.

8. The non-pneumatic tire according to claim 1, wherein a through hole into which the synthetic resin material enters and is fixed to is formed in the reinforcing member.

* * * * *